(12) United States Patent
Hertz

(10) Patent No.: US 9,340,845 B2
(45) Date of Patent: May 17, 2016

(54) METHOD FOR SURFACE PROCESSING A ZIRCONIUM OR HAFNIUM ALLOY, AND COMPONENT PROCESSED IN THIS MANNER

(75) Inventor: Dominique Hertz, Sainte Foy les Lyon (FR)

(73) Assignee: AREVA NP, Courbevoie (FR)

( * ) Notice: Subject to any disclaimer, the term of this patent is extended or adjusted under 35 U.S.C. 154(b) by 1347 days.

(21) Appl. No.: 12/809,997

(22) PCT Filed: Dec. 15, 2008

(86) PCT No.: PCT/FR2008/052302
§ 371 (c)(1),
(2), (4) Date: Jun. 21, 2010

(87) PCT Pub. No.: WO2009/081013
PCT Pub. Date: Jul. 2, 2009

(65) Prior Publication Data
US 2010/0269960 A1    Oct. 28, 2010

(30) Foreign Application Priority Data

Dec. 21, 2007  (FR) ..................................... 07 60239

(51) Int. Cl.
*C21D 10/00* (2006.01)
*C22C 16/00* (2006.01)
(Continued)

(52) U.S. Cl.
CPC ................ *C21D 7/06* (2013.01); *C21D 10/005* (2013.01); *C22C 16/00* (2013.01); *C22F 1/00* (2013.01); *G21C 3/20* (2013.01); *G21C 7/10* (2013.01); *G21C 21/02* (2013.01); *G21C 21/18* (2013.01);
(Continued)

(58) Field of Classification Search
CPC ............................... C21D 7/06; C21D 10/005
USPC ................................................... 148/421, 558
See application file for complete search history.

(56) References Cited

U.S. PATENT DOCUMENTS 3,505,064 A * 4/1970 Mock et al. ................... 420/422
3,805,459 A   4/1974 Baksay
(Continued)

FOREIGN PATENT DOCUMENTS

EP  1136578 B1 * 10/2004 .............. C22C 16/00
EP  1486988       12/2004
(Continued)

OTHER PUBLICATIONS

Wen et al. "Martensite and its reverse transformation in nanocrystalline bulk Co", Materials Science and Engineering A, 438-440, 2006, 420-426.*
(Continued)

*Primary Examiner* — Rebecca Lee
(74) *Attorney, Agent, or Firm* — Davidson, Davidson & Kappel, LLC

(57) ABSTRACT

A method for surface processing at least a portion of a component of zirconium or hafnium alloy, including at least one operation of nanostructuring a surface layer of the alloy so as to confer on the alloy over a thickness of at least 5 μm a grain size which is less than or equal to 100 nm, the nanostructuring being carried out at a temperature which is less than or equal to that of the last thermal processing operation to which the component was previously subjected during its production. Component of zirconium or hafnium alloy processed in this manner.

22 Claims, 2 Drawing Sheets

(51) Int. Cl.
*C21D 7/06* (2006.01)
*C22F 1/00* (2006.01)
*G21C 3/20* (2006.01)
*G21C 7/10* (2006.01)
*G21C 21/02* (2006.01)
*G21C 21/18* (2006.01)
*C22C 28/00* (2006.01)

(52) U.S. Cl.
CPC ....... *G21Y 2002/103* (2013.01); *G21Y 2004/40* (2013.01); *Y02E 30/39* (2013.01)

(56) References Cited

U.S. PATENT DOCUMENTS

| | | | |
|---|---|---|---|
| 4,284,660 | A | 8/1981 | Donaghy et al. |
| 4,473,410 | A | 9/1984 | Grubb et al. |
| 5,498,302 | A * | 3/1996 | Davidson ............ 148/317 |
| 6,926,780 | B2 * | 8/2005 | Xiong et al. ............ 148/558 |
| 7,300,622 | B2 | 11/2007 | Lu et al. |

FOREIGN PATENT DOCUMENTS

| | | |
|---|---|---|
| FR | 2157640 | 6/1973 |
| FR | 2425702 | 12/1979 |
| FR | 2689431 | 10/1993 |
| JP | 8001514 | 1/1996 |
| WO | WO 0210462 | 2/2002 |
| WO | WO 0210463 | 2/2002 |
| WO | WO 2004007788 | 2/2004 |

OTHER PUBLICATIONS

Tao, N. R. et al., "Surface Nanocrystallization of Iron Induced by Ultrasonic Shot Peening," *Nanostructured Materials*, Elsevier, New York, NY, US, vol. 11, No. 4, Jun. 1, 1999.

Volker, Schulze, "Procedures of Mechanical Surface Treatments," *Modern Mechanical Surface Treatment*, 2006, pp. 9 to 24.

Zhang, L. et al., "Nanocrystallizaion of Zirconium Subjected to Surface Mechanical Attrition Treatment," Nanotechnology, vol. 19, Mar. 20, 2008, pp. 1 to 7.

* cited by examiner

METHOD FOR SURFACE PROCESSING A ZIRCONIUM OR HAFNIUM ALLOY, AND COMPONENT PROCESSED IN THIS MANNER

The invention relates to the field of zirconium alloys, used in particular as components for fuel assemblies for light water nuclear reactors, in particular as fuel claddings, or structural guide tubes, or planar elements of those assemblies such as grid plates or bands. It also relates to hafnium alloys, which are used in particular to constitute control rods in light water reactors, for example, as components which absorb the neutrons of control clusters for pressurised water reactors or control crosses for boiling water reactors.

BACKGROUND

It will be appreciated that the fuel assembly of a light water nuclear reactor of the pressurised water type (PWR) or boiling water type (BWR) is composed in particular of a bundle of "rods", that is to say, claddings containing pellets based on uranium oxide constituting the fuel, and various structural components bringing about positioning and mechanical retention of the rods and the handling thereof (guide tubes, retention grids, springs, housing, water duct, etc.). The claddings and at least some of the structural elements are constructed of zirconium alloy, that element having the advantage of allowing neutrons to pass, and also of being able to have the mechanical properties and corrosion resistance necessary in the media involved when the alloy elements and their contents are advantageously selected.

Among the zirconium alloys conventionally used, the following non-exhaustive examples may be set out:

alloys which are referred to as "Zircaloy" and which contain in particular tin, iron, chromium, oxygen and, in some cases, nickel;

Zr—Nb alloys such as M5® from the company AREVA NP, which contain approximately from 1 to 2.5% by weight of niobium, or also other elements, in particular such as oxygen, iron and tin.

Those compositions are given only by way of example, as an indication of one of the preferred contexts of the invention, it being applicable to zirconium alloys of all precise compositions, and also hafnium alloys, as will be seen below.

Similarly, it will be appreciated that, in order to adjust the reactivity of the core of the nuclear reactor during operation of the reactor, the elements absorbing the neutrons are moved inside (PWR reactors) or between (BWR reactors) some assemblies of the core in a vertical position, either in the insertion direction or in the removal direction, so as to introduce a greater or lesser length of the absorbent portions into the assemblies of the core. The control rods for pressurised water reactors are constituted by a support which is generally designated "spider" and a bundle of absorbent rods which can slide inside the guide tubes of the assembly. They are referred to as control clusters.

An absorbent rod can be constituted by a tube of hafnium optionally containing another absorbent material, or a bar full of hafnium.

The control rods of a boiling water reactor are generally in the form of plates which are assembled in cross-like form and are capable of sliding between the housings of the fuel assemblies. The plates may be of an absorbent material (hafnium), or be of steel and comprise inserts of absorbent materials (for example, $B_4C$ or hafnium). They are generally referred to as control crosses.

Hafnium is the metal absorbing neutrons originally used for control clusters of civil and naval reactors. Although subsequently reserved for military use, today it is increasingly used as a neutron absorbent in light water reactors, its availability having increased greatly with the development of zirconium alloys. Hafnium is present at a ratio of from 2 to 4% in zirconium ore, and must be separated therefrom owing to its great neutron absorption. Therefore, it constitutes a by-product of the production of zirconium alloys, and its use in control clusters of reactors allows its value to be exploited.

Hafnium has the advantage over other absorbent materials of having excellent compatibility with the primary coolant and it can therefore be used without cladding. It can be used in the pure state or in a weakly alloyed state with elements such as tin and/or oxygen in order to increase its mechanical characteristics, iron, chromium and/or niobium in order to increase its corrosion resistance, and molybdenum in order to increase its wear resistance. Finally, owing to the difficulties involved in separating hafnium and zirconium, it may comprise up to 2.5% of residual zirconium, preferably a maximum of 1%.

Both for zirconium alloys and for hafnium and its alloys, the chemical properties (such as resistance to various types of corrosion by water from the reactor coolant system) capable of continuing depending on the conditions of use of the alloy: nodule corrosion, general corrosion, corrosion under stress, corrosion under irradiation, etc.) and mechanical properties (tensile strength, elastic limit, flux resistance, friction and wear resistance, etc.) which are desirable are in particular obtained by coordinating the selection of the alloy elements and the contents thereof and the selection of the thermal and thermomechanical processing operations undergone by the alloy ingot during the production of the element, such as spinning, laminating and/or drawing operations, quenching operations, annealing operations, various surface polishing or finishing operations.

The corrosion of a cladding of zirconium alloy becomes evident, for example, owing to the formation of a layer of zircon $ZrO_2$. It brings about a loss in mass of the metal and therefore a reduction in the outside diameter of the metal cladding, and also a substantial modification of the thermal characteristics thereof because zircon is ten times less conductive than the base metal. That oxidation also becomes evident as the formation of hydrogen, a portion of which becomes diffused in the cladding and forms hydrides which embrittle it. It also modifies the friction properties of the surface of the cladding. It further modifies the properties of resistance to wear of the surface of the cladding. It further modifies the nucleation sites of the deposits which crystallise from the heat exchange fluid (which deposits are conventionally referred to as "CRUD", which is an acronym standing for Chalk River Unidentified Deposit) and may bring about an increase in the quantity of those deposits. It also diminishes the friction conditions of the fluid over the surface, which has a detrimental effect on the pressure drops of the assembly. Finally, it modifies the nucleation of bubbles of vapour, and therefore the thermo-hydraulic behaviour during exchanges between the rod and the heat exchange fluid.

During the production and assembly operations of the fuel assemblies, superficial defects, such as scratches or local microdeformations, are formed on the claddings, produced in particular by friction to which the fuel rods are subjected when they are inserted in the skeleton of the fuel assembly. Those initial superficial defects may aggravate subsequent deterioration of the corrosion or wear behaviour.

Damage may also become evident during operation in the event of contact of the rod and the support elements thereof in the grids, and owing to migrating bodies which become trapped in the grids and strike the cladding. During operation of the nuclear reactor, the coolant water which flows with a high upward speed in the core brings about small oscillating movements of the nuclear fuel rods inside the spacer grids and any foreign bodies jammed in the structure of the assembly. This phenomenon, which is known as "fretting", will result in friction between the nuclear fuel rods and the contact portions which may bring about wear of the claddings of the nuclear fuel rods. That wear could bring about puncturing of the claddings of the fuel rods, and therefore a release of radioactive materials and gas into the water of the reactor coolant system, which may lead to a shutdown of the reactor for premature removal of the fuel assemblies comprising defective rods. Furthermore, when the cladding is punctured, hydrogen generated by radiolysis of the water of the reactor coolant system which is introduced inside the rod brings about massive hydriding of the cladding which may lead to fractures thereof owing to embrittlement.

A similar phenomenon of fretting exists with regard to the inserts when the BWR control cross is constituted by structural plates which are generally composed of steel, gripping inserts of absorbent material. The wear of the surface layer of oxide of the insert of hafnium allows hydriding thereof and may lead to deformation of the control cross owing to the expansion of the hafnium under the effect of the hydriding action. This may lead to an increase in the volume of the material by 15%. Such deformation is unacceptable because it may bring about an increase to the insertion duration of the control cross, or even jamming thereof.

Furthermore, the guide tubes of the fuel assembly, which are also constructed from zirconium alloy, are exposed to wear owing to friction or fretting on the rods of the control clusters, and vice versa. Such wear of the guide tubes reduces the thickness of metal, where applicable up to puncturing thereof, which involves a risk of causing disruption to the flow of the heat exchange fluid and occurrences of dangerous mechanical weakening during operation or during handling between cycles. Wear of the rod of a cluster or of the control cross is equally harmful, it being possible for mechanical weakening to lead to fracturing of the component involved.

The cladding of the fuel rod is the first confinement barrier of the fission products, the other barriers being constituted by the vessel of the reactor and the concrete vessel.

During normal operation (situations referred to as being of class 1) and malfunctioning operation (situations referred to as being of class 2), the sealing of the cladding with regard to the fission products must therefore be ensured.

During a transient power occurrence corresponding to a situation of class 2, the power locally reached in the fuel may be from two to three times greater than nominal power. That rapid increase in power brings about great expansion of the pellets. The thermal expansion of the pellets brings it to that of the cladding and results in the cladding being placed under traction by the pellets and an increase in the stresses on the internal surface of the cladding, up to a level which may exceed the elastic limit of the material constituting the cladding, thereby bringing about damage to the cladding. Furthermore, that mechanical stress takes place in the presence of an aggressive chemical environment owing to the fission products, such as iodine, released by the fuel during the power occurrence. This is referred to as Pellet Cladding Interaction (PCI), a phenomenon which may lead to rupture of the cladding.

Such rupture of the cladding is not permitted for reasons of safety, because it could lead to the release of fission products in the reactor coolant system of the reactor.

It is conceivable to attempt to solve those different problems by carrying out surface processing operations of the component involved. However, one risk is that, during these processing operations, it may be necessary to bring the component to a relatively high temperature, which would impair the internal metallurgical structure and the mechanical properties of the component obtained following the production operation.

Furthermore, it is still not desirable to process the whole of the surface of the components. Some zones must, for example, be left to allow subsequent welding. It is not always easy, when the surface processing is carried out, to protect the zones to be left. The masking of the zones to be left must be tight, the protective material is at risk of polluting the material to be protected and, before the processed component is put into operation, it is necessary to ensure that all the protective material has been removed. Therefore, the application of conventional surface processing methods often involves implementation difficulties for these reasons.

This is true, for example, of internal coverings of the claddings of fuel rods. It is known to use, in the core of the nuclear reactors, fuel assemblies which comprise rods containing a substance which is highly absorbent with respect to neutrons, such as gadolinium or erbium or zirconium diboride $ZrB_2$. The last one is in particular used in the form of an internal covering of the cladding tubes, which is generally carried out by surface deposition, via methods which are often complex to carry out and which do not ensure constant quality of the covering, with regard to its surface quality, its adhesion and obtaining a defined and constant thickness of the covering. Furthermore, it is often very difficult to avoid the presence of covering in end portions of the tube at which the closure plugs of the fuel rod subsequently have to be welded.

The fuel assembly also comprises planar elements, such as the grid plates or bands. They must have precise mechanical properties, which are obtained by suitable selection of the composition thereof and the processing operations to which they are subjected during production thereof. Again, a surface processing operation may have a positive or negative influence on those mechanical properties, and the development of surface processing operations which are simple and economical to implement and confer improved properties on the component would be highly advantageous.

The sensitivity to wear of the components of hafnium during friction on the guiding elements (guide tubes or housings) requires surface processing. That surface processing can be carried out by diffusion of oxygen at 860° C. for several hours under an argon/oxygen atmosphere. In this case, it is not known how to protect the zones which have to be subsequently processed by machining or formed. Again, there is a need for a surface processing method which, on the one hand, would be used at low temperature and would not therefore excessively change the mechanical properties of the alloy and, on the other hand, would allow efficient masking of the zones which must not be affected by the diffusion of oxygen.

When an improvement to corrosion resistance and/or other mechanical or chemical properties of the component is sought, it is possible to consider using metal or ceramic protective coverings. However, that technology has limits linked to the non-adhesion of the covering and the cracks which may appear in the event of thermal cycles or mechanical stresses.

It is also known that the deposit of CRUD is linked to the precipitation by chemical reaction of colloids present in the reactor coolant system at the surface of the rods, in particular if that surface is rough. Document EP-A-1 486 988 proposes bringing about an alternating arrangement of polished and non-polished zones on the surface of the rods in order to limit adhesion and the growth of the oxide crystals.

It is also possible to carry out processing operations involving diffusion by the thermochemical route of elements such as carbon, nitrogen, boron, oxygen, etc. However, even though they do improve the mechanical strength, some elements may be incompatible with an application to zirconium alloys. The diffusion of carbon and nitrogen impairs the corrosion stability in water at high temperature, and boron is a neutron absorbent which is converted into gaseous helium under irradiation. Furthermore, those processing operations must be carried out at a temperature which is too high to maintain the mechanical properties of the substrate. In this manner, a diffusion of oxygen over a depth of approximately twenty µm could be carried out on an alloy of zirconium prepared according to conventional methods only at a temperature in the order of 800° C. for a few hours, which would inevitably bring about a radical modification of the metallurgical structure of the whole of the material. That would necessitate complete reconsideration of the prior steps of the production method in order to obtain the final properties sought, and it is not at all certain that it would be possible to do so.

In order to carry out a surface diffusion of oxygen over approximately forty µm on hafnium alloys, the temperature or the duration must be even greater (930° C.-3 hours, or 860° C.-6 hours or 800° C.-36 hours), which is incompatible with maintaining high mechanical properties linked with a work-hardened state (recrystallisation temperature in the order of from 700 to 750° C.). The processing operation for diffusion of oxygen on hafnium at 650° C. for 6 hours results only in a layer of oxide having a thickness of the order of 1.5 µm and a subjacent layer of diffusion of oxygen of small thickness (from 3 to 5 µm), which is not enough for wear resistance.

SUMMARY OF THE INVENTION

An object of the invention is to provide a type of final surface processing of zirconium or hafnium alloys, in particular for the nuclear industry, allowing improvement of the friction properties and/or properties of resistance to different types of corrosion, but without changing the mechanical properties of the component which would have been carefully adjusted by the selection and execution of the preceding steps of the production method, or even to improve them.

To that end, the invention provides a method for surface processing at least a portion of a component of zirconium or hafnium alloy, characterised in that it comprises at least one operation of nanostructuring a surface layer of the alloy so as to confer on the alloy over a thickness of at least 5 µm, a grain size which is less than or equal to 100 nm, the nanostructuring being carried out at a temperature which is less than or equal to that of the last thermal processing operation to which the component was previously subjected during its production.

The depth of the nanostructured layer is preferably at least 5 µm, more preferably at least 20 µm.

At least one of the nanostructurings may be carried out by SMAT.

At least one of the nanostructurings may be carried out by USSP.

The method may be carried out on the external surface of the component.

The method may be carried out on an internal surface of the component.

It is possible to carry out, after or at the same time as that operation, a processing operation which modifies the composition of the nanostructured layer and which is carried out at a temperature which is less than or equal to that of the last thermal processing operation to which the component was previously subjected during its production.

The processing operation modifying the composition of the nanostructured layer may be a thermochemical processing operation for diffusion of one or more elements.

The diffused element may be oxygen.

It is possible to carry out the diffusion of oxygen in an oven under an atmosphere of Ar—$O_2$ or Ar—$CO_2$.

The diffusion of oxygen in the nanostructured layer may be carried out naturally during use of the component.

The diffused element(s) may be carbon and/or nitrogen.

The diffused element(s) may be selected from erbium, gadolinium, europium, samarium, dysprosium, hafnium, boron or admixtures thereof.

The diffused element may be chromium.

The diffusion of the diffused elements may be a codiffusion or a sequenced diffusion of a plurality thereof.

The processing operation modifying the composition of the nanostructured layer may be a processing operation for chemical vapour deposition of one or more elements.

The zirconium or hafnium alloy may be an alloy which can be used in the production of the components of nuclear reactors.

The alloy may be a zirconium alloy comprising, as addition elements, at least tin, iron, chromium and oxygen.

The alloy may also comprise nickel.

The alloy may comprise, as an addition element, at least niobium, optionally also other elements, such as oxygen, iron and/or tin.

The invention also relates to a component of zirconium alloy, characterised in that it has been surface processed by the above method.

It may be an element for a nuclear fuel assembly.

The alloy may be a hafnium alloy comprising, as addition elements, at least oxygen and iron and a maximum of 2.5%, preferably a maximum of 1%, of residual zirconium.

The invention also relates to a component of hafnium alloy, characterised in that it has been surface processed by the above method.

It may be a neutron absorbent component for a control cluster or control cross of a nuclear reactor.

As will have been understood, the invention is firstly based on carrying out a mechanical processing operation of nanostructuring of the surface of the zirconium or hafnium alloy by substantial plastic surface deformation.

The depth over which that structural transformation is carried out depends on the objective thereof. A depth of at least 5 µm for physicochemical applications (corrosion, relaxation, pressure drops, etc.) and at least 12 µm for mechanical applications (wear, friction under load) allows an improvement in the behaviour in terms of corrosion and/or thermohydraulics (pressure drops, boiling, thermal transfers, non-nucleation of deposits of oxides).

A depth of a few tens of µm (from 15 to 50 µm, for example) is suitable for limiting the wear of the material.

A depth of a few tens of µm (from 50 to 250 µm, for example) is suitable for integrating neutron poisons.

That nanostructuring involves refining the microstructure of the material, which is generally microscopic (from 1 to 10 µm) after the processing operations, until a size of the grains is obtained that is less than 100 nm, preferably of the order of 30 nm or less, corresponding practically to an amorphous structure being obtained.

That nanostructuring alone may already be sufficient to improve the friction properties of the component processed, and its fatigue resistance, because of the surface work-hardening which it involves. However, that structure is not always capable of being maintained for all the components under operating conditions of a nuclear reactor because of the recrystallisation owing to being kept for several thousands of hours at the high temperatures reached and the irradiation.

That nanostructuring constitutes a favourable background for carrying out surface processing operations at relatively low temperature because it increases by several powers of ten the flux of intergranular diffusion.

In particular, it becomes possible to produce at moderate temperature (that is to say, in particular below the temperature for the last thermal processing operations of the processing sequence of the components of zirconium, that is, for some of them, from 480 to 560° C. in accordance with the relaxed or recrystallised metallurgical state thereof) a diffusion layer of oxygen over a thickness corresponding to the depth of the nanostructured zone (for example, of the order of 20 µm and higher), without great formation of zircon (except for in some specific cases where the formation of a surface layer of zircon is desirable, but on condition that it can become fixed to a diffusion layer which is enriched with oxygen, which the nanostructuring of the surface allows to be obtained).

Similarly in relation to hafnium, it becomes possible to carry out a diffusion of oxygen at 600° C. over a depth of approximately forty µm.

BRIEF DESCRIPTION OF THE DRAWINGS

The invention will be better understood from a reading of the following description, which is given with reference to the following appended Figures, in which.

DETAILED DESCRIPTION

Figure 1:
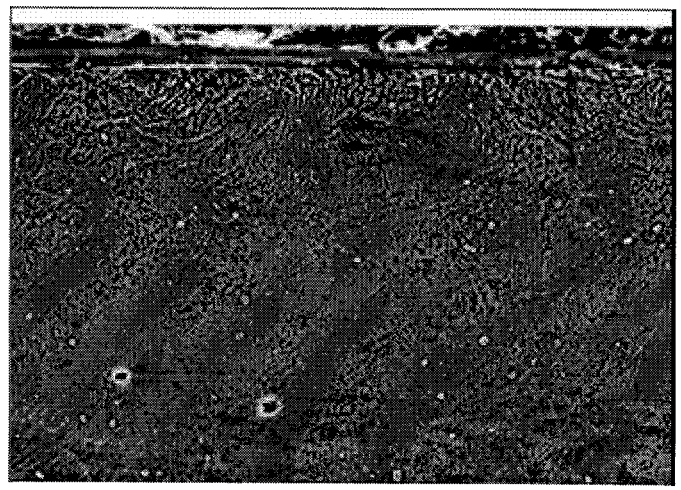
FIG. 1 is a metallographic section of the surface of a tube of Zircaloy 4 which has been subjected to nanostructuring according to the invention.

Various methods for processing the surface of a material without addition of material result in such nanostructuring and can be used in the context of the invention. Some of them will now be described, but the listing thereof must not be considered to be exhaustive.

It includes peening by means of balls, which are harder than the substrate and are constructed from steel or zircon (that material being most suitable for limiting any risk of contamination of the zirconium), or less hard (such as ice and dry ice). Peening may be used, in known manner, to produce compression stresses at the surface of the components in order to improve the behaviour thereof in terms of wear, fatigue or corrosion.

However, it is important to determine the precise method of peening in order to obtain optimum results in terms of quality of the final product and cost of the operation, in order to solve the problems set out to which the invention relates, in particular when a diffusion of one or more elements in the nanostructured layer is carried out afterwards.

Various other mechanical processing techniques may be envisaged in order to carry out the nanostructuring of the surface layers on metal materials by using high surface stresses, such as discharge peening, processing by laser peening, micro-cavitation (water jet), surface rolling and ultra-rapid processing.

The SMAT method (Surface Mechanical Attrition Treatment), described, for example, in "Materials, Science and Engineering A 375-377 (2004) 38-45)" or in the document WO-A-02/10462, allows nanostructuring of the surface of a metal material by the introduction of defects and/or interfaces into the grains of material which will lead to multiplication of the sub-grains. Bombarding the surface with smooth spherical balls is brought about by vibrating those balls in a chamber, of which one of the walls vibrates and another wall is constituted by the surface to be processed. The balls may have a size of from 1 to 10 mm and be constituted of various materials. The vibration frequency of the chamber is from 50 to 20000 Hz, so that the excited balls rebound against the walls, collide with each other and bombard the surface to be processed in a wide range of directions and speeds for a short time. The speed of the balls is from 1 to 20 m/s depending on the vibration frequency, the size of the balls and the distance between the wall to be processed and the vibrating wall. Each impact brings about plastic deformation. Consequently, the multiplication of the multidirectional impacts results in severe plastic deformation and progressive reduction of the grain size, until a nanometric size is obtained over the whole of the peened surface.

As a general rule, the size of the grains gradually increases, from the surface as far as a depth of approximately fifty µm, from a few nm at the surface to approximately a hundred nm at depth. Beyond (down to a depth of approximately 100 µm), a layer having a refined structure comprising crystallites of submicronic size is found. In deeper layers, the grains are deformed with the presence of all sorts of dislocation configurations, such as dense stacks, interlacings and cells of dislocations.

A comparison of the SMAT and conventional peening, referred to as shot-peening (SP), in which ultra-sound is not used, gives rise to the appearance of several differences. The size of the balls may be higher in SMAT (from 1 to 10 mm) than in SP (from 0.2 to 1 mm). The surface of the balls must be as smooth as possible at risk of aggravating the phenomena of abrasion of the surface. The speed of the balls in SMAT is far less (from 1 to 20 m/s) than that of conventional peening (typically approximately 100 m/s). SP is quite a directional method (the flow of balls is normal relative to the surface). In SMAT, however, the impacts are multi-directional which is necessary to bring about refinement of the structure of the grains.

In one of the embodiments of the SMAT method described, for example, in document FR2812285, the balls are directed onto the surface of the component by means of a projection nozzle which is movable in translation and/or rotation (unless it is the component itself which moves in front of the nozzle which remains fixed in position). The balls are completely spherical, and their ricochets against the walls of the vessel, which is conical or hemispherical, are adjusted to cause them to strike the surface of the component a large number of times, in accordance with different and varied directions of incidence. The balls are recovered by gravity and returned to the nozzle. By provision of a high frequency of the ultrasound (50 kHz, for example) and a duration of the processing operation that is sufficient (from a few minutes to 1 hour, for example), the nanostructuring of the surface processed may involve a layer which may be up to several tens of µm. In another embodiment of the method described in document WO200210463, the surface to be processed constitutes the wall of a box containing the balls, the box as a whole being agitated so that the movement of the balls peens the surface to be processed.

The method of peening by ultra-sound USSP (Ultrasonic Shot Peening), described in document FR-A-2 689 431, is an application under conditions which are slightly different from the basic principle of SMAT. It involves introducing the component to be processed into a closed vessel and therein causing hard metal or ceramic balls, having a diameter of approximately from 0.1 to 3 mm, to move by means of an ultrasound generator (approximately 20 kHz). It moves in order to carry out a regular processing operation for the whole of the surface of the component. That method is advantageous when it is desirable to obtain nanostructuring only over a depth limited to a few tens of µm.

Generally, ultrasonic peening methods have a number of advantages over more conventional methods, in the context of the invention.

It is possible to select the geometry of the chamber and the peening parameters in accordance with the form of the component to be processed, in order to obtain homogeneous processing over the whole of the surfaces.

It is not necessary to disassemble the component in order to carry out processing.

The peening parameters can be controlled with precision, ensuring good reproducibility of the results.

The processing operations may be relatively short.

In contact with the vibrating walls, the balls are projected, colliding with each other and moving at random in the vessel during processing, in the manner of the molecules of a gas. In this manner, there is obtained homogeneous processing in the whole of the volume of the vessel.

The coverage rate may rapidly reach the desired values of, for example, from 200 to 400% (in other words, in that example, each point of the surface to be processed is subjected to from 2 to 4 ball impacts for the duration of processing).

The cost is low in relation to peening, which would use a jet of compressed air, because it is readily possible to recover the peening balls, which are expensive.

Since the balls are recovered and reused during the whole processing operation, it is possible to use a relatively small number thereof, but of a quality which is high and constant in terms of great hardness and spherical shape, thereby keeping the cost of the processing within very acceptable limits. That high quality of the balls allows the surface state of the component to be impaired less than with balls of usual quality. In this manner, the fatigue resistance of the component is improved, the risk of the balls breaking during processing is reduced, as is damage to the surface of the component which it would cause, and good reproducibility of the processing is ensured.

Finally, when it is desirable to process the internal surface of a tube, such as a fuel cladding or a guide tube, it is possible to use the tube itself as a vessel for processing, if balls having a sufficiently small diameter are used.

The zones which must not be processed can be masked by screens.

It is possible to envisage carrying out a plurality of successive nanostructuring operations, optionally by different methods, for example, in order to obtain a gradient of properties in accordance with the thickness of the product, which might be beneficial for the subsequent processing operations. In this manner, a first mean but deep nanostructuring may be followed by a second nanostructuring which is finer and more superficial. An object of the first nanostructuring, for example, would be to affect the mechanical properties of the material in terms of depth, whilst an object of the second nanostructuring, for example, would be to reduce the adhesion of the CRUD.

After that nanostructuring of the upper layer of the component, it is subsequently possible, according to a variant of the invention, to carry out processing involving diffusion of oxygen inside the nanostructured layer, but preventing as much as possible the formation of zircon (when the component processed is of an alloy of Zr). The diffusion of other elements, such as nitrogen, carbon, erbium, gadolinium, europium, samarium, dysprosium, hafnium, boron (the list not being exhaustive), may also be envisaged in order to obtain various effects. The diffusion of oxygen, without significant formation of zircon, is particularly indicated in order to increase the corrosion resistance of the surface processed.

Optionally, the diffusion processing can be carried out simultaneously with the nanostructuring, if the processing temperature is compatible with satisfactory execution of the two operations.

In order to carry out that diffusion, it is necessary to select the temperature and duration of the processing, and the medium providing the element to be diffused, for example, oxygen.

The superficial concentration of the diffusing element, the temperature and the duration control the diffusion of the chemical element. They must be selected to allow that diffusion with the results intended, but also so as not to impair the mechanical properties obtained during the preceding processing operations. Therefore, the temperature must not in theory exceed that of the last thermal processing operation preceding the processing operation according to the invention which allowed the final mechanical properties to be obtained. Also, the temperature and the processing time must not impair the nanostructure of the surface obtained during the first step, in particular by an increase in the grains and relaxation of the stresses. A temperature of from 400 to 560° C. is very suitable for processing the external surface of a cladding of an alloy of zirconium, for example, of the type Zircaloy 4 or M5®.

As for the medium providing oxygen, if it is that element which it is desirable to diffuse, it may be preferable to avoid air because it would introduce a small amount of nitrogen into the diffusion layer, which is not always desirable, for reasons of corrosion resistance, if the alloy already initially has a content of nitrogen similar to the maximum acceptable. Water can result in superficial hydriding which is detrimental to mechanical properties. The media $Ar-O_2$ and $Ar-CO_2$ are therefore among the most recommended elements to that end.

Generally, the partial pressure of oxygen must not be so great as to lead to the preferential formation of oxide in relation to the diffusion of atomic oxygen, at least away from the extreme surface of the nanostructured layer. A medium $Ar-O_2$ with from 3 to 20% of oxygen, or air (with the reservations set out above), or a medium with a higher content of oxygen but under pressure reduced by a few mbar (from 0.5 to 5) may be recommended to that end.

The operation may be carried out in an open oven, with a constant flow of oxygen. The surface of the component is charged with oxygen until it reaches the superficial concentration of equilibrium, then an equilibrium becomes established between the incoming flow at the surface and the flow diffusing towards the interior of the component. The thickness of the layer of oxide and that of the diffusion layer increase according to the laws of diffusion.

The operation may also be carried out in a closed oven, therefore initially containing a given quantity of oxygen which is not subsequently replenished. The quantity of oxygen available limits the thickening of the layer of oxide, whilst the diffusion layer continues to increase so long as the content of oxygen of the interface metal/oxide remains high, that is to say, so long as a layer of oxide remains.

In both cases, the objective is to bring about, over the desired depth (of from a few μm to several tens of μm), oversaturation with oxygen of the surface of the metal, whilst minimising the increase in the superficial layer of oxide.

Also, in place of processing by diffusion of oxygen or another element, it is possible to envisage carrying out superficial processing of the nanostructured surface by chemical vapour deposition (CVD or MOCVD). That operation may involve, for example, local deposit of a consumable poison (erbium or gadolinium, for example) on the internal wall of the claddings of the fuel rods. However, diffusion of those elements in the nanostructured surface, which is carried out in a manner comparable with that described for the diffusion of oxygen, is also possible. In such a method, the preliminary nanostructuring is capable of:

promoting the initial reactivity of the surface, which allows a reduction in the deposit temperature and limits the reaction in a homogeneous phase;

promoting superficial diffusion, particularly at low temperature, which will increase the adhesion of the deposit;

limiting the reorientation of the grains during the increase in the layer whilst maintaining the effect of "initial disorder" (less basaltic or columnar growth).

Again, in order not to impair the properties and structures obtained by the preceding processing operations, that superficial processing must not be carried out at a temperature greater than that of the last thermal processing operation which preceded the nanostructuring.

One possibility also involves carrying out a first nanostructuring over a relatively large depth, then a processing operation taking advantage of that nano structuring, such as a diffusion of oxygen involving at least the majority of that nanostructured layer. Subsequently, it is possible to carry out at least one other finer nanostructuring operation over a smaller depth than the first one, that other nanostructuring itself being able to be accompanied or followed by a processing operation taking advantage of it, which may be, for example, additional diffusion of oxygen or another element, chemical vapour deposit, etc.

The method according to the invention may be carried out over the whole of the component involved, or only over a portion thereof, where it would be particularly advantageous, whilst it would be superfluous or not recommended over the remainder of the component.

It is also possible to envisage that the diffusion of oxygen in the nanostructured layer is carried out in a natural manner during use of the component, if it is exposed to a medium capable of releasing that oxygen (for example, by oxidation during exposure to water at high temperature).

Some applications of the invention which it is possible to set out in a non-limiting manner are as follows:

protection of the exterior of a cladding of a fuel rod against oxidation and hydridation, increasing the wear resistance thereof, reducing the adhesion of the muds formed by corrosion products ("CRUD"), reduction of the pressure drops, increasing the mechanical properties; to that end, it is possible to carry out nanostructuring by SMAT, followed or accompanied by a diffusion of oxygen; a diffusion of carbon or chromium may also be envisaged to protect the cladding against corrosion;

protection of the interior of that same cladding against interaction between pellets/claddings (PCI) and against secondary hydridation, and improvement of its mechanical properties; to that end, it is possible to carry out a nanostructuring by SMAT, followed or accompanied by a diffusion of oxygen;

local deposit of a consumable poison (such as erbium or gadolinium) on the internal wall of the claddings, by nanostructuring by SMAT then diffusion of the poison in the nanostructured layer, or deposit of the poison by CVD;

protection of the interior of the guide tubes against wear by the ends of the control clusters, and increase of the mechanical properties of the guide tubes, by nanostructuring of their surface followed by a subsequent diffusion of oxygen;

mechanical nanostructuring processing, optionally followed by a diffusion processing operation carried out over the surface of the grid springs of zirconium alloy, in order to promote the sliding thereof against the fuel rods and the electrochemical behaviour in order to limit the risks of wear and localised corrosion thereof; a nanostructuring by USSP may be sufficient to that end; the diffused element may be oxygen;

processing components of hafnium for neutron absorption, by SMAT nanostructuring of the surface thereof, then diffusion of oxygen, for the purpose of improving the wear resistance thereof;

processing components of zirconium alloy and/or hafnium (not subjected to corrosion stresses by water or vapour at high temperature) by SMAT nanostructuring of the surface thereof, then diffusion of nitrogen (by gas or ion nitriding at from 300 to 600° C.), for the purpose of improving the wear resistance thereof.

The invention can also be used in fields other than the nuclear industry, for applications in which nanostructuring of the surface of a zirconium or hafnium alloy, optionally followed by physicochemical processing (diffusion, CVD, etc.), would seem to be advantageous.

Examples of processing operations carried out according to the invention will now be described in a detailed manner.

Anti-Wear Processing of the External Surface of the Fuel Rods

Nuclear fuel cladding tubes of zirconium alloy, having a length of approximately 4 m and a thickness of approximately from 0.5 to 0.6 mm, are processed externally, after the last rolling pass, during a mechanical surface processing operation by peening using balls of zircon having a diameter of from 0.5 to 2.5 mm. Using balls of zircon prevents any contamination of the alloy which could subsequently become evident as a weakening of the water corrosion resistance of the reactor coolant system.

The agitation of the balls is brought about by the base of a chamber vibrating at high frequency (from 5000 to 20000 Hz), each tube extending through that chamber. The vibration amplitude is selected to be in the range of from 20 to 100 μm (depending on the diameter of balls selected). The duration of the mechanical processing is approximately from 5 to 15 minutes. In order to improve the homogeneity of the processing, the tubes are rotated (from 1 to 2 rpm).

The processing can be carried out in a single operation (if the chamber is quite long), or in a plurality of sequences with the tubes being advanced step by step with covering, or moving with continuous advance. The ends of the tubes are not processed. To that end, it is simply necessary not to pass the ends into the chamber when the balls are moving.

After that mechanical activation of the surface, the tubes are subjected to thermochemical processing under an atmosphere of Ar—$O_2$ (from 3 to 15% of $O_2$ under from 0.5 to 5 mbar) at a temperature less than the temperature of the last thermal processing operation, for example, for 15 hours at 400° C. for tubes of Zircaloy 4. There follows introduction of oxygen in the form of a solid solution over a depth of approximately 20 µm without formation of a layer of zircon of more than 1 µm over the entire mechanically activated surface, the non-activated ends not having diffusion of oxygen and a tiny superficial oxidation (less than 500 nm).

That thermomechanical processing operation may be carried out after the last thermal processing operation which was carried out at reduced pressure or under non-oxidising gas. It may also, for the sake of energy economy and minimising handling operations, be carried out at the same time as the thermal processing by introducing the oxidising mixture into the oven at the desired temperature.

The claddings processed in this manner may be subjected to all the finishing operations still to be carried out, then be welded to the plugs of fuel rods without the welding being affected by the presence of oxygen. The hardening of the external surface prevents the appearance of production defects following impacts, prevents changes to the surface of the rods during insertion thereof into the fuel assembly, which may impair the corrosion resistance thereof in the event of remaining for a long time in the reactor, reinforces the wear resistance of the rod at the locations of contact with the grids of the assembly and by migrating bodies which are sometimes present in the reactor coolant system.

FIGS. 1 to 4 illustrate the effects of such a processing operation. They relate to the tube test-pieces of Zircaloy 4.

FIG. 1 shows the nanostructuring state of the surface layer of those tubes in the relaxed state, after USSP peening carried out for 15 minutes with balls of zircon having a diameter of 0.8 mm. The amplitude of the vibrations was 50 µm and their frequency was 20 kHz. Those processing conditions involve relatively little energy and led to a nanostructuring only over a thickness of a few µm. It would have been possible to carry it out over a greater thickness.

Figure 2:
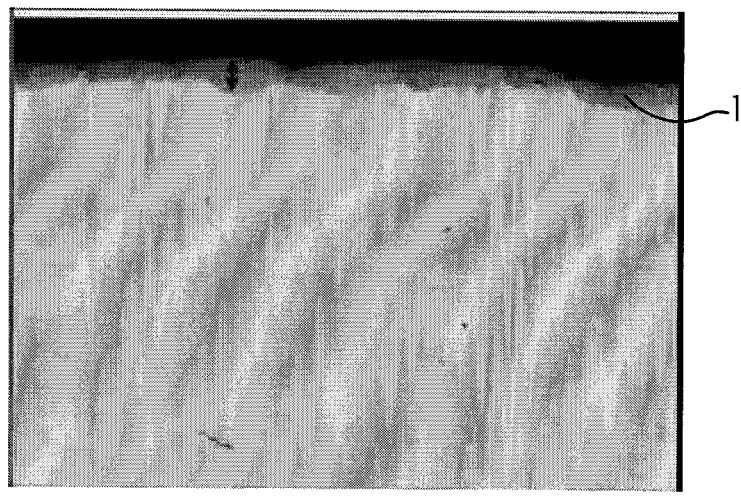
FIG. 2 is a metallographic section of a test-piece comparable with that of FIG. 1, after spending 15 hours under air at 450° C.
Figure 4:
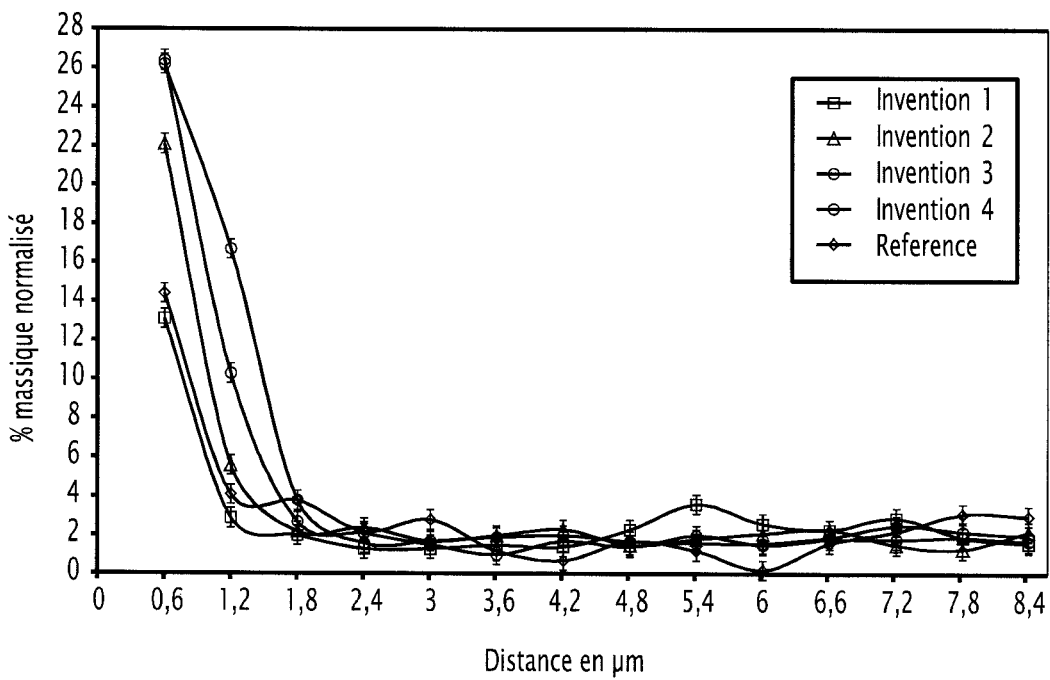
FIG. 4 shows the content of oxygen of those same surface layers after spending 15 hours under air at 450° C.

FIG. 2 shows (in the phase composition mode) the surface layers of that same tube after it has remained for 15 hours under air at 450° C. That time spent therein has brought about the formation of a layer of zircon 1 of the order of thickness of 1 µm at an extreme surface, but has not caused deeper oxidation of the metal in the form of zircon. However, it has caused the diffusion of atomic oxygen in the nanostructured layer, as shown in FIG. 4.

Figure 3:
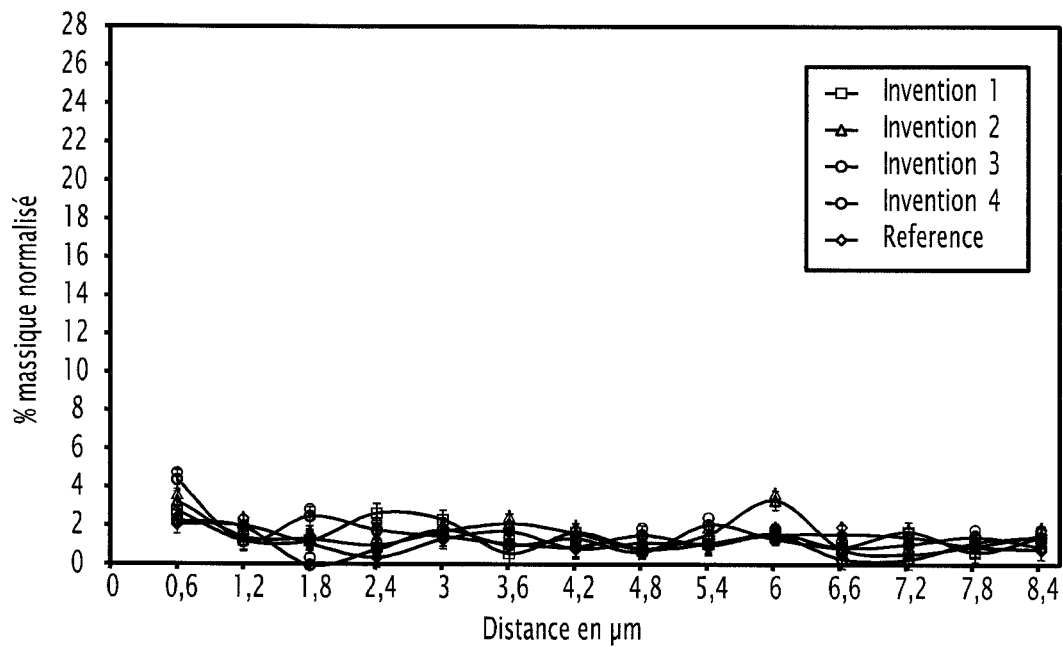
FIG. 3 shows the content of oxygen in the surface layers of test-pieces of Zircaloy 4 which may or may not have been subjected to a nanostructuring processing operation according to the invention.

FIG. 3 shows the content of oxygen at an extreme surface of test-pieces comparable with those of FIG. 1 (therefore, before processing in air), when there has not been nanostructuring of the surface layers (reference) and nanostructurings having increasing energy levels (invention 1 to invention 4). It is measured by electron dispersion spectrometry (EDS). It can be seen that, in all the test-pieces, that content is of the order of less than 3% over a thickness of approximately 8 µm. The peening constitutions of the test-pieces are set out in Table 1.

TABLE 1

Conditions for peening the test-pieces

| | Diameter of the balls | Amplitude of vibration | Processing duration |
|---|---|---|---|
| Reference | Not peened | | |
| Invention 1 | 0.85 mm | 25 µm | 15 min |
| Invention 2 | 1.6-2.5 mm | 25 µm | 10 min |
| Invention 3 | 0.85 mm | 40 µm | 10 min |
| Invention 4 | 0.85 mm | 52 µm | 10 min |

FIG. 4 shows that same content of oxygen in the test-pieces after they have been processed under air at 450° C. for 15 hours. At an extreme surface, there can be seen in all cases, to different extents, the formation of a surface layer of zircon which leads to a very substantial increase of the content of oxygen over a thickness of the order of 1.5 µm. However, the superficially nanostructured test-pieces behave differently from the reference test-piece which is not nanostructured, and even more so because the nanostructuring has been carried out with higher energy. In their case, there can be seen a substantially higher content of oxygen at an extreme surface, and a distinctly more progressive reduction of the content of oxygen in accordance with the depth of the surface layer. That content of oxygen finds its normal level for a depth of approximately 2 µm. By a comparison of FIGS. 2 and 4 which correspond to the example "invention 4" above, it can be seen that beyond 1 µm in the example in question the increase of the content of oxygen does not correspond to the formation of zircon, but does correspond to a diffusion of atomic oxygen, as sought according to the invention.

b) Anti-Wear Processing of the Internal Surface of the Guide Tubes

Nuclear fuel guide tubes of zirconium alloy having a length of approximately 4 m and a thickness of approximately 0.4 mm are processed internally over their upper portion, after the last rolling pass, during a mechanical surface processing operation by peening using balls of zircon having a diameter of from 0.5 to 1.5 mm. The balls introduced into each tube, in a portion limited by removable plugs, are agitated by ultrasound agitation of the guide tube itself or by introduction of an ultrasonic vibrating element inside each tube. The processing conditions are similar to those of the preceding example. The zones which have to be welded to the grids in order to form the skeleton of the assembly can be welded without fear of the effect of the presence of oxygen because those zones, which have not been mechanically activated owing to the screens, also will not be oxidised.

There follows a diffusion similar to that of the preceding example inside the guide tube, which allows an increase in the wear resistance thereof by the rods of control clusters permanently inserted in the guide tubes and subjected to transverse fluxes causing them to vibrate. The risk of the guide tubes becoming punctured, which would disrupt hydraulic flows, or the wall becoming thinner, which would impair the mechanical strength during handling of assemblies, is eliminated.

c) Incorporation of Consumable Poisons in an Alloy of Zr

The interior of the fuel claddings is activated mechanically as in the preceding example. Ball bearings of steel or nickel alloy can be used because corrosion phenomena do not really have to be feared inside the rods. They may have a size which is slightly greater than those of the preceding examples, that is, from 1 to 4 mm. Consequently, the energy efficiency of the activation processing operation is greater and the depth affected may be up to from 100 to 300 µm.

The thermochemical processing operation is carried out at a temperature less than the temperature of the last thermal processing operation of the alloys (this is approximately 480° C. in order to obtain a relaxed state, approximately 560° C. in order to obtain a recrystallised state, it naturally being possible for those temperatures to vary substantially in accordance with the precise composition of the alloy and the method of obtaining the component). It is carried out by introducing a reaction gas inside the tubes (for example, a carrier gas Ar—$H_2$ and organometallic compound of erbium, such as the β-diketones chelates, cyclopentadienides or halogenides complexed by halogenides of aluminum, for example).

During the thermal processing operation, the organometallic is decomposed or reduced and the erbium released diffuses over the entire activated depth. In this manner, enrichment with erbium is obtained over a depth which may be up to 300 µm and a content of the order of 20%.

That enrichment with consumable poison (which may be not only erbium but also another element of the class of the rare earths, such as gadolinium, dysprosium, europium, samarium, or hafnium, or boron, and admixtures of those elements), equivalent to a content of up to 3% in the entire thickness of the cladding, is sufficient to allow the desired optimisation of the neutron flux during the life of the fuel without causing an increase in pressure in the rod (absorbent of the type n-γ and not of the type n-α), without affecting the mechanical strength of the cladding, or its corrosion resistance.

In a variant of that example, there is carried out, after activation of the surface, not a diffusion of an absorbent element, but a deposit of oxide of that element. In that manner, there is added to the reduction gas Ar—H₂ and reaction gas containing the precursor, for example, in the form of β-diketones chelates, cyclopentadienides or halogenides complexed by halogenides of aluminium, an oxidising element, such as carbonic gas $CO_2$. In this manner, there is obtained a deposit of erbium oxide increasing at from 2 to 4 µm/h with an excellent adhesion owing to the diffusion in the interface zone. Since the quantity equivalent to 3% of the cladding which is approximately 600 µm thick is 18 µm of metallic erbium or 20.6 µm of $Er_2O_3$, that deposit is effectively obtained in approximately ten hours.

The activation and diffusion processing operations may also be carried out on tube blanks before the last rolling pass, which allows advantage to be taken of a greater temperature range for diffusion (up to 800° C.) and therefore of a greater quantity of absorbent in a short time.

d) Anti-CRUD Processing of the External Surface of the Fuel Claddings

As in the first example, the external surface of the fuel claddings is activated, but over a small depth (approximately 5 µm), reducing the processing time and the energy of the balls (diameter of less than 1 mm and vibration amplitude of less than 50 µm). The thermomechanical processing is carried out at the temperature of the last thermal processing operation. In this manner, there is obtained a very coherent layer of zircon of from 1 to 2 µm thick, solidly secured to a layer in which oxygen has diffused over approximately 5 µm. That smooth layer of zircon, which is chemically inert, allows, in the reactor, prevention of germination of nodules of oxides from the ions in solution in the reactor coolant system, and therefore scaling of the claddings with CRUD, which is detrimental to the thermal transfer of the rod and which promotes corrosion of the cladding in the region of the cracks of those occurrences of CRUD. That smooth layer of zircon which is chemically inert also limits pressure drops during the flow of the coolant fluid over the rods.

e) Improvement of the Resistance of the Grid Plates to Mechanical Damage

During the production of the grids, the zirconium alloy band is activated, at each face, by peening using balls of zircon over a depth of approximately 20 µm. The presence of superficial compression stresses limits the initial appearance of cracks during cutting and forming of the grid plates by swaging the band. After assembly of the grid and welding, the whole of the grid is processed at approximately 450° C. for a few hours under an atmosphere of Ar—$O_2$ (from 3 to 15% of $O_2$ under from 0.5 to 5 mbar).

The thermomechanical processing leads, as in the preceding example, to the formation of a fine layer of smooth and coherent zircon, which adheres securely to the substrate owing to the presence of the diffusion layer enriched with oxygen. That layer of zircon promotes the reduction of pressure drops, and mechanical reinforcement of the support elements of the fuel rods. The risk of deformation of those support elements by creeping is therefore reduced, which leads to better retention of the rods during the cycles in the reactor.

f) Improvement of the Wear Resistance of Absorbent Bars and Plates of Hafnium

The external surface of components of hafnium, which are used as components of a control cluster or a control cross of nuclear reactors, is activated by peening by balls of zircon as in the first example over a depth of approximately 50 µM. A thermomechanical processing operation under Ar—$O_2$ at 650° C. (from 3 to 15% of $O_2$ under from 0.5 to 5 mbar) allows a diffusion of oxygen to be obtained over approximately 50 µm, and therefore ensures the wear resistance of the linear portion of the control clusters against the guiding boards or during continuous guiding and of the lower end against the guide tubes of the fuel assembly or of the control crosses against the housing of the fuel assemblies.

That processing is carried out over a portion or over the whole of the components, except for the upper connection zone, before assembly in rods of control clusters or in control crosses, then at the connections of those rods or plates, once they are complete.

g) Improvement of the Wear Resistance of a Component of Zirconium Alloy and/or Hafnium Alloy not Loaded by Corrosion in Water or Vapour at High Temperature.

These are metal-working components for chemical or nuclear use which are loaded in terms of wear (components of pumps, valves, connectors, vessels, etc.).

The external surface is activated by peening by balls of zircon, steel or even alloy 718 as in the preceding examples over a depth of approximately from 20 to 150 µm in accordance with stresses in terms of wear (pitting, abrasion, erosion, cavitation or fatigue).

Subsequent diffusion of nitrogen, carbon or nitrogen and carbon is carried out at low temperature (from 400 to 550° C. for zirconium alloys, from 600 to 650° C. for hafnium) by thermochemical methods in the gas or plasma phase. To that end, the precursor gas may be based on ammonia, a hydrocarbon, such as propane or propene in the case of the gaseous method or nitrogen and/or methane in the case of the ion method. The diffusion of nitrogen and carbon reaches the nanostructured depth in a few hours. The associated hardening protects from wear. The zones omitted during the peening do not have any diffusion and may be formed and welded subsequently.

The invention claimed is:

1. A method for surface processing at least a portion of a component of zirconium or hafnium alloy, comprising at least one operation of nanostructuring a surface layer of the alloy so as to confer on the alloy over a thickness of at least 5 µm a grain size less than or equal to 100 nm, the at least one operation of nanostructuring being carried out at a temperature less than or equal to a temperature of a last thermal processing operation the component was previously subjected during a production of the component.

2. The method according to claim 1 wherein at least one of the operations of nanostructuring is carried out by SMAT.

3. The method according to claim 1 wherein at least one of the operations of nanostructuring is carried out by USSP.

4. The method according to claim 1 wherein the method is carried out on an external surface of the component.

5. The method according to claim 1 wherein the method is carried out on an internal surface of the component.

6. The method according to claim 1 further comprising a processing operation either simultaneously or after the at least one operation of nanostructuring, the processing operation modifying a composition of a nanostructured layer, the processing operation being performed at a temperature less than or equal to a temperature of the last thermal processing operation the component was previously subjected during the production of the component.

7. The method according to claim 6 wherein the processing operation modifying the composition of the nanostructured layer is a thermochemical processing operation for diffusion of one or more elements.

8. The method according to claim 7 wherein the diffused element is oxygen.

9. The method according to claim 8 wherein the diffusion of oxygen is carried out in an oven under an atmosphere of $Ar$—$O_2$ or $Ar$—$CO_2$.

10. The method according to claim 9 wherein the diffusion of oxygen in the nanostructured layer is carried out naturally during use of the component.

11. The method according to claim 7 wherein the one or more diffused elements are carbon and/or nitrogen.

12. The method according to claim 7 wherein the one or more diffused elements is selected from erbium, gadolinium, europium, samarium, dysprosium, hafnium, boron or admixtures thereof.

13. The method according to claim 7 wherein the one or more diffused elements is chromium.

14. The method according to claim 7 wherein the processing operation includes codiffusion or successive diffusion of a plurality of elements.

15. The method according to claim 6 wherein the processing operation modifying the composition of the nanostructured layer is a processing operation for chemical vapor deposition of one or more elements.

16. The method according to claim 1 wherein the zirconium or hafnium alloy is an alloy which can be used in the production of the components used in nuclear reactors.

17. The method according to claim 16 wherein the alloy is a zirconium alloy comprising, as addition elements, at least tin, iron, chromium and oxygen.

18. The method according to claim 17 wherein the alloy further comprises nickel.

19. The method according to claim 17 wherein the alloy further comprises niobium.

20. The method according to claim 19 wherein the alloy also comprises nickel.

21. The method according to claim 1 wherein the alloy is a hafnium alloy comprising, as addition elements, at least oxygen and iron and a maximum of 2.5% of residual zirconium.

22. The method as recited in claim 21 wherein the maximum of residual zirconium is 1%.

* * * * *